Figure 1:
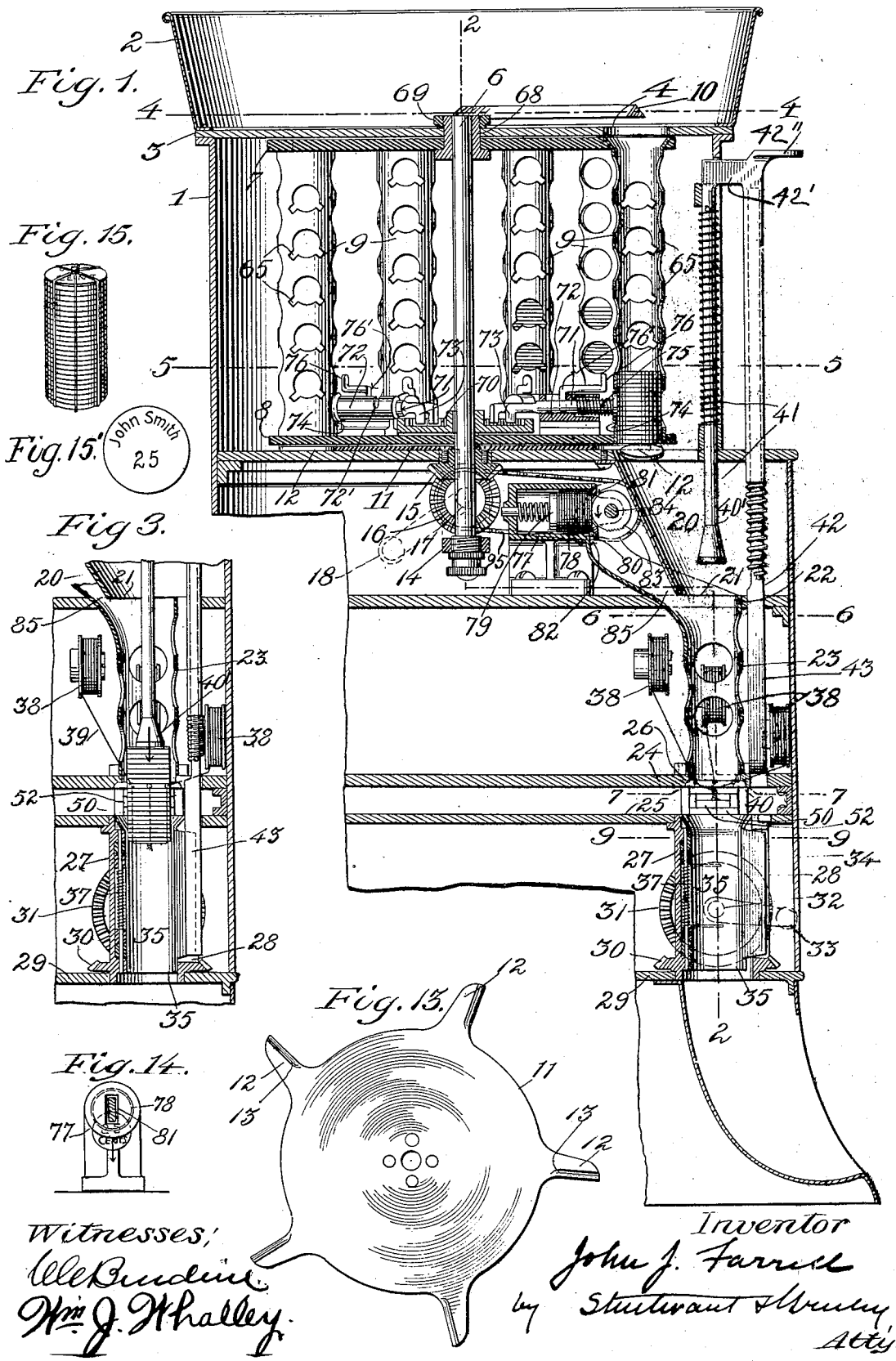

No. 860,598. PATENTED JULY 16, 1907.
J. J. FARRELL.
MACHINE FOR COUNTING, PACKAGING, AND LABELING COINS.
APPLICATION FILED MAR. 21, 1906.

5 SHEETS—SHEET 2.

No. 860,598. PATENTED JULY 16, 1907.
J. J. FARRELL.
MACHINE FOR COUNTING, PACKAGING, AND LABELING COINS.
APPLICATION FILED MAR. 21, 1906.

5 SHEETS—SHEET 3.

Witnesses
Inventor
John J. Farrell
By
Attorneys

No. 860,598. PATENTED JULY 16, 1907.
J. J. FARRELL.
MACHINE FOR COUNTING, PACKAGING, AND LABELING COINS.
APPLICATION FILED MAR. 21, 1906.
5 SHEETS—SHEET 4.
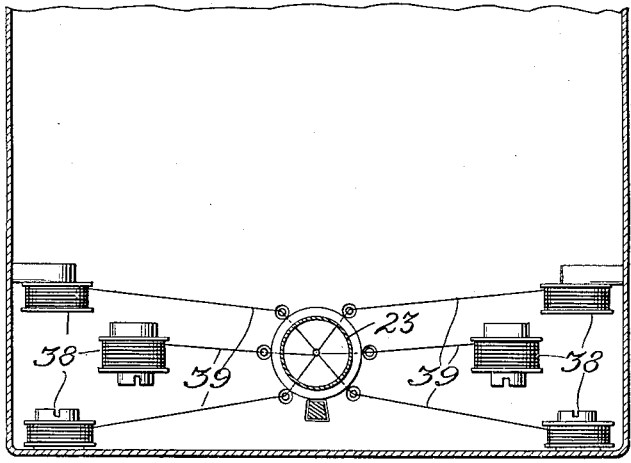
Fig. 6.
Fig. 10.
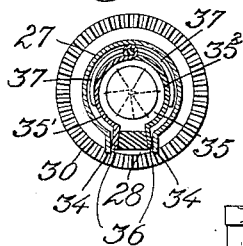
Fig. 11.
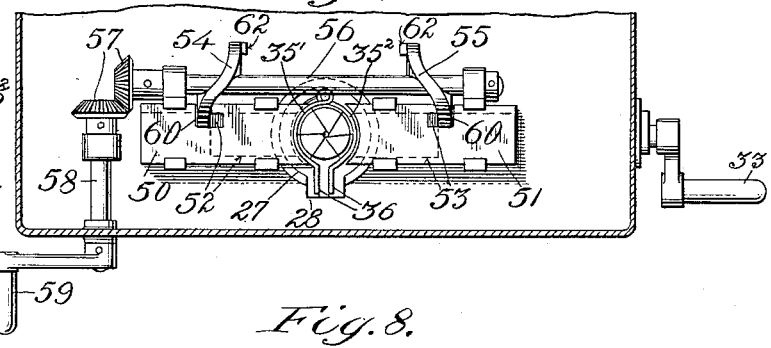
Fig. 7.
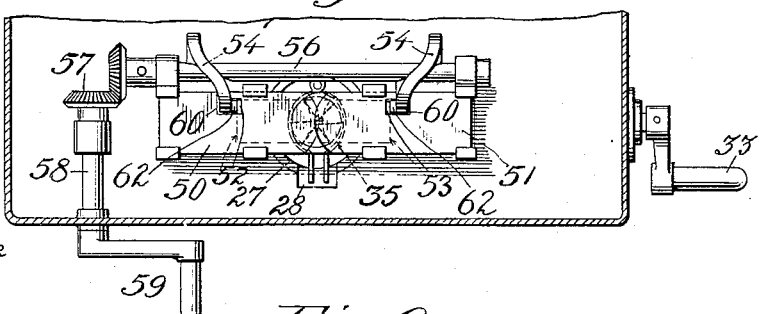
Fig. 8.
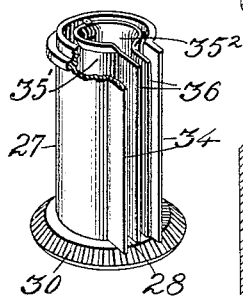
Fig. 12.
Fig. 9.
WITNESSES:
INVENTOR
John J. Farrell
BY Sturtevant & Brierly
Attorneys No. 860,598. PATENTED JULY 16, 1907.
J. J. FARRELL.
MACHINE FOR COUNTING, PACKAGING, AND LABELING COINS.
APPLICATION FILED MAR. 21, 1906.
5 SHEETS—SHEET 5.
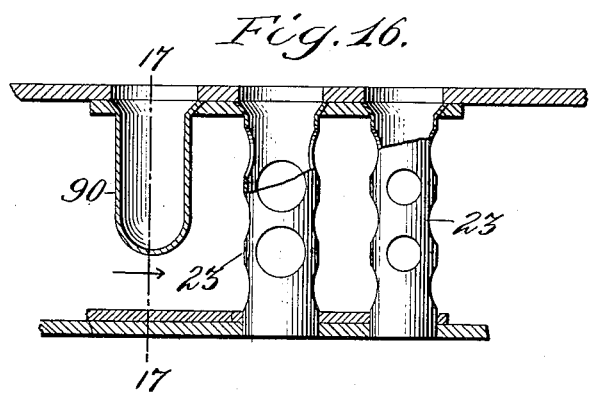
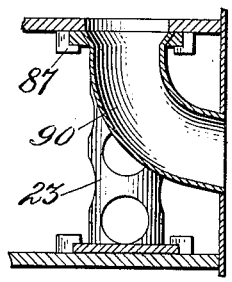
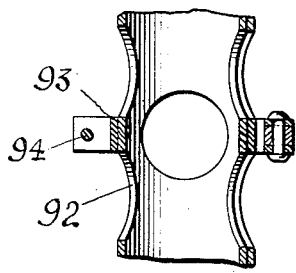
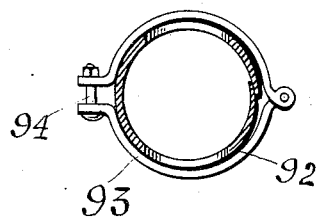
Witnesses:
Inventor
John J. Farrell
by Sturtevant & Grundy
Atty's

UNITED STATES PATENT OFFICE.

JOHN J. FARRELL, OF ATLANTIC CITY, NEW JERSEY.

MACHINE FOR COUNTING, PACKAGING, AND LABELING COINS.

No. 860,598.                    Specification of Letters Patent.                Patented July 16, 1907.

Application filed March 21, 1906. Serial No. 307,233.

*To all whom it may concern:*

Be it known that I, JOHN J. FARRELL, a citizen of the United States, residing at Atlantic City, in the county of Atlantic, State of New Jersey, have invented certain new and useful Improvements in Machines for Counting, Packaging, and Labeling Coins, of which the following is a description, reference being had to the accompanying drawing, and to the letters and figures of reference marked thereon.

My invention relates to machines for counting packaging and labeling coins.

In handling coins of denominations less than a dollar, it is customary to make them up in rolls or packages, each roll or package containing a certain number of the coins so as to avoid counting the individual coins every time they are paid from one person to another. For instance, quarters are usually made up in packages of twenty or forty, equal to five or ten dollars, and the packages are paid out as readily as a five or ten dollar bill or a single coin of the value of five or ten dollars. Cents may be made up in packages of twenty-five or fifty, and the packages may be handled almost as conveniently as a single coin of the same value. Such packages are usually made up by hand, though machines have been devised for counting the coins and making them up into packages, but such machines, so far as they are known to me, are complicated and expensive.

It is the object of my invention to produce a machine by which coins may be counted mechanically, and made up into packages and labeled, the machine being adapted to assort, count and package coins of different sizes and also capable of use to either count without packaging or to package coins previously counted by hand or otherwise, and to label each package.

With this object in view my invention consists in the construction and combination of elements hereinafter described and particularly pointed out in the claims.

Figure 2:
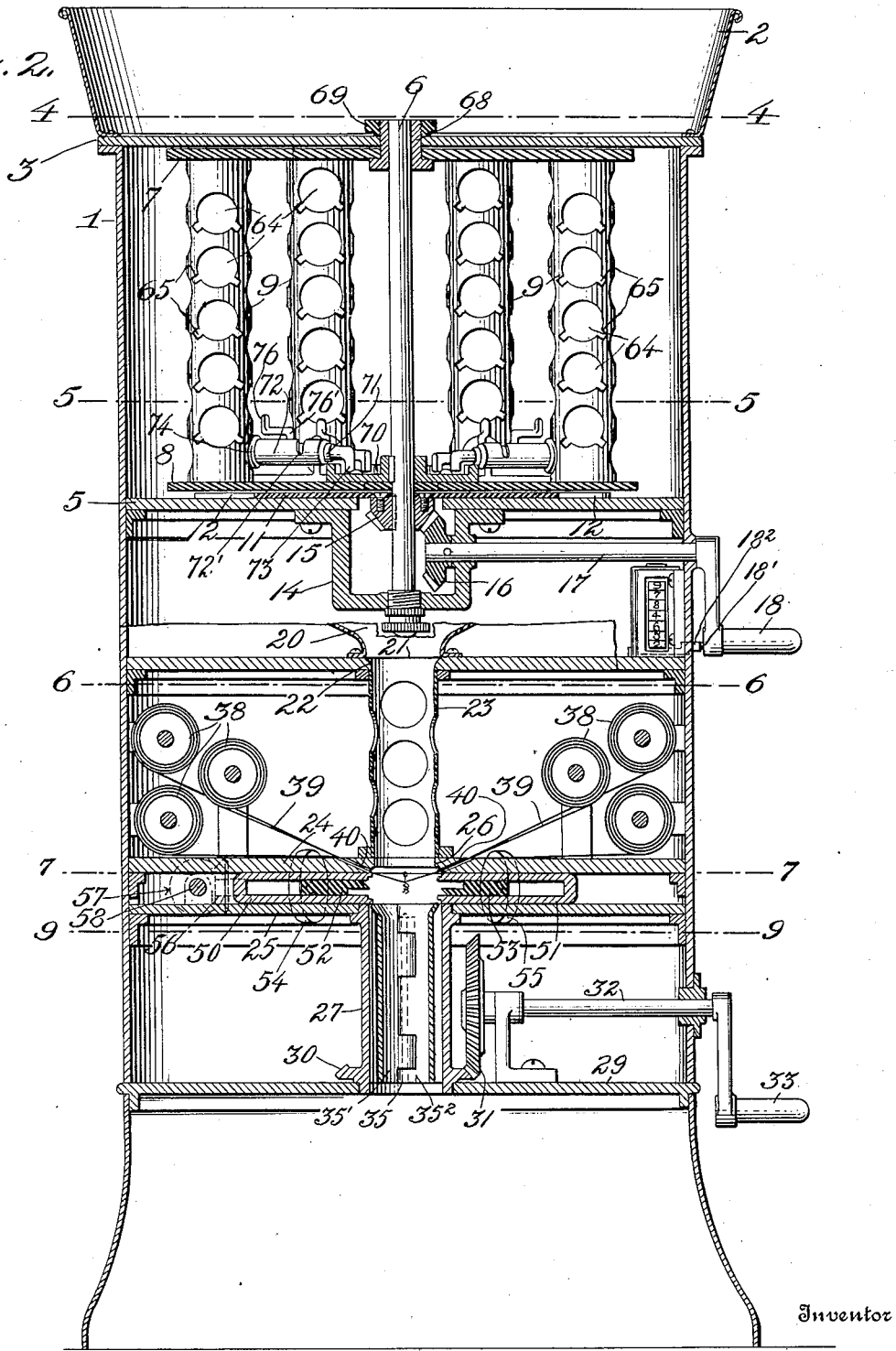
Figure 4:
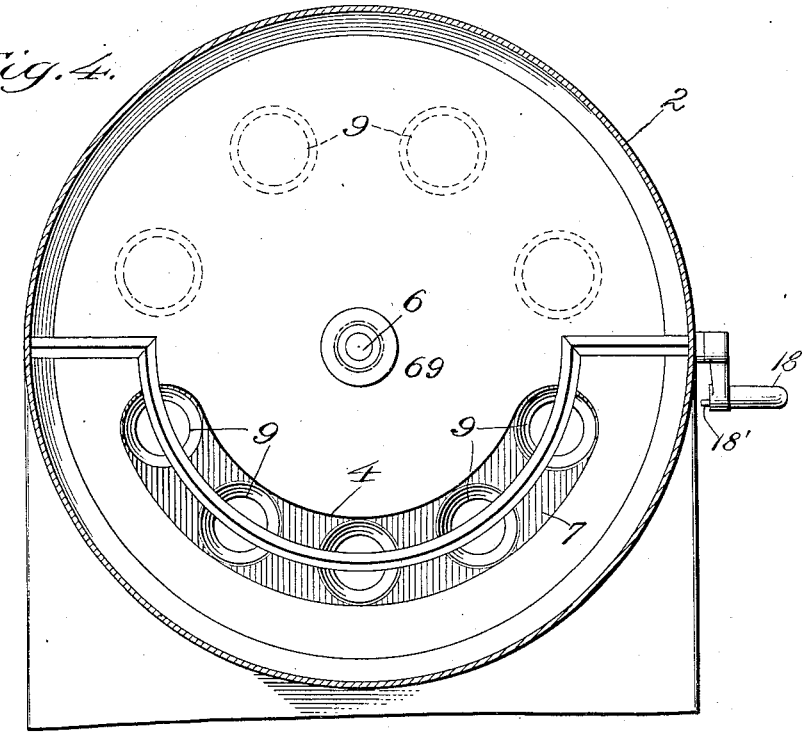
Figure 5:
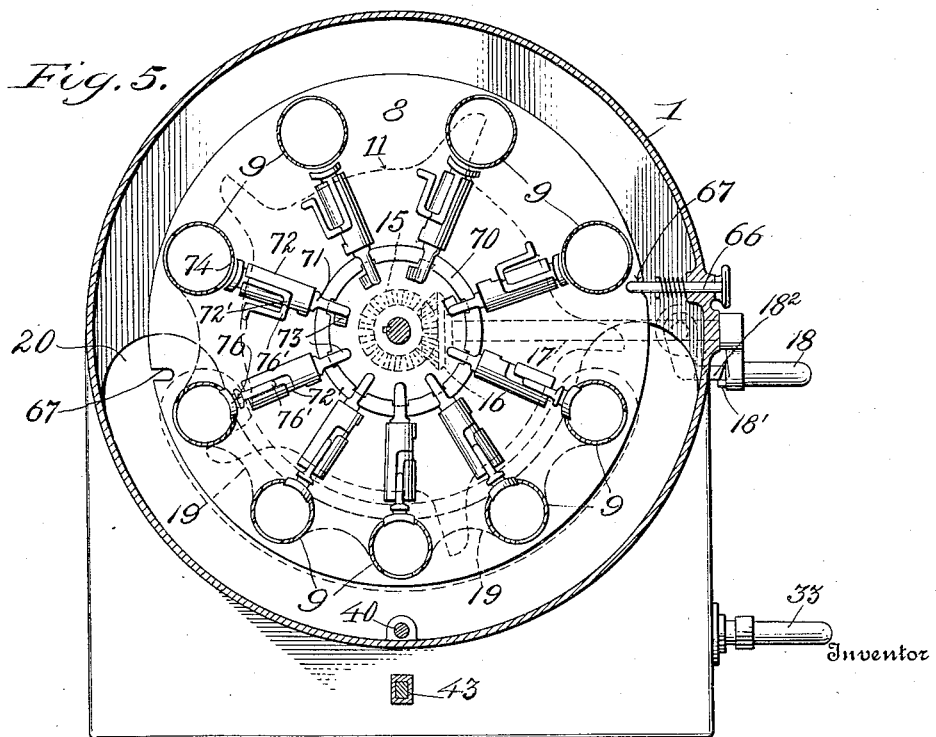

Referring to the drawings, Figure 1 is a vertical sectional view on a plane passing through the center of the machine parallel with the front; Fig. 2 is a corresponding view on a plane at right angles to that on which Fig. 1 is taken; Fig. 3 is a cross sectional view on the same plane as Fig. 1, showing a pile of coins being pushed down into the packaging device; Fig. 4 is a cross sectional view on line 4—4 of Figs. 1 and 2; Fig. 5 is a cross sectional view on line 5—5 of Figs. 1 and 2; Fig. 6 is a cross sectional view on line 6—6 of Figs. 1 and 2; Fig. 7 is a cross sectional view on line 7—7 of Figs. 1 and 2; Fig. 8 is a cross sectional view on the same plane as Fig. 7, but showing the parts in different position; Fig. 9 is a cross sectional view on line 9—9 of Figs. 1 and 2; Fig. 10 is a detail view of cam for operating the cutters; Fig. 11 is a detail cross sectional view of the packaging device on the plane of line 9—9 of Figs. 1 and 2, showing the inner tube open to receive the coins; Fig. 12 is a perspective view of the packaging device; Fig. 13 is a detail view showing the star wheel; Fig. 14 is a detail cross sectional view of the label holder; Fig. 15 is a perspective view of a completed coin package; Fig. 15' is a view of a label Fig. 16 is a cross sectional view on the same plane as Fig. 2, showing a modified arrangement for the receiver tube; Fig. 17 is a cross sectional view on line 17—17 of Fig. 16; Figs. 18 and 19 are respectively vertical and horizontal sectional views of a modified form of coin tube.

1 is the frame or casing, in which the working parts of my machine are mounted.

2 is a ring of metal extending about the upper edge of the top plate 3 of the machine, and forming with the top plate a hopper to receive the coins to be counted. The top plate 3 is cut away, as shown at 4, for a portion extending about half way around it near its outer edge.

Beneath the top plate 3 and between it and an intermediate plate 5 is arranged a shaft 6, on which rotates an upper disk 7 and lower disk 8, in which are secured the ends of a series of open ended coin tubes 9. These coin tubes are arranged in two or more concentrically arranged groups. In the construction shown two groups only are shown, one group being made up of five coin tubes of a size to readily receive the smaller coins such as dimes and cents, and the other made up of four coin tubes of a size adapted to receive nickels and quarters.

If desired, tubes of a size suitable to receive half dollars may be used, but for ordinary use tubes for dimes and cents and for quarters and nickels will be sufficient.

The coin tubes are arranged near the peripheries of the disks 7 and 8, and are so located that whatever position the disks may be rotated to the coin tubes of one or the other of the groups of tubes will be in line with the opening 4 in the top plate.

On the top plate in such position that it lies diametrically across each of the coin tubes which are in line with the opening 4 is a wire or rod 10, slightly above the open end of the tubes, for preventing the coins from falling perpendicularly in the tube. This wire or rod 10 may be of any form in cross section, but is preferably triangular in cross section, and arranged with its apex pointing upward. The space beneath the wire or rod 10 is preferably sufficient to permit of coins sliding beneath it.

Beneath the lower disk 8, and between it and the intermediate plate 5 is a star wheel 11, carried by the shaft 6, and having a series of projecting arms 12, preferably of the form shown, and preferably also beveled away on their rear sides as shown at 13. Each arm of this star wheel when operated as hereinafter described, knocks or pushes out from beneath the open lower end of each coin tube which may be in operative position, a single coin.

The shaft 6 on which the star wheel is secured extends through the intermediate plate 5 and has its bearings at its upper end in the top plate 3, and at its lower end is secured in a hanger 14 depending from the intermediate plate 5. On the shaft is secured a bevel wheel 15, with which meshes a bevel wheel 16 carried by a shaft 17 extending to the side of the machine, and having at its outer end an operating handle 18, or other operating means.

The intermediate plate 5 forms the support on which the piles of coins in the coin tubes rest. The front edge of this plate is cut away, so as to permit the coins when pushed or knocked out by the star wheel, to fall over its edge into the receiving hopper or funnel 20. For this purpose, the plate is so cut away that the piles of coins will rest with their edges projecting over the edge of the plate, but not projecting sufficiently to permit of their falling without being pushed.

In order to facilitate the dropping of the coins when pushed by the arms of the star wheel, the edge of the plate is further cut away between the portions on which the piles of coins rest so as to form recesses 19. The coins being pushed by the arms of the star wheel laterally, as well as outwardly, they will be pushed over the edge of the plate without any possibility of being carried to the next coin tube.

Beneath the intermediate plate 5 is a receiving hopper or funnel 20, having its rear edge secured to the under side of the plate in rear of the rear edge of the recess 19, and having its forward edge extending forward beyond the line of the intermediate plate 5. The walls of the hopper converge toward a point near the front of the machine, and at this point is found an opening 21. The receiving hopper or funnel is preferably supported on a second plate 22, having therein an opening in line with the opening 21.

Beneath and in line with the opening 21 is arranged a receiver tube 23, adapted to receive coins from the receiving hopper or funnel 20. This receiving tube is supported between the second plate 22 and the upper one of the cutter supporting plates 24 and the receiving tube may be permanently or detachably secured in position, or may be mounted to slide into or out of position, if desired, as hereinafter described.

The upper and lower cutter supporting plates 24 and 25 have formed through them an opening 26, in line with the opening in the receiver tube 23. Between these plates 24 and 25 are arranged cutters hereinafter described, and beneath the lower plate 25, in line with the opening 26 is arranged the device in which the coins are packaged.

From what has been above described, it will be obvious that coins placed in the hopper formed by the ring 2, and top plate 3, will fall into the coin tubes 9 which are in line with the opening 4, and that as the star wheel is rotated coins will be pushed out from under the lower edge of the several tubes and will be caused to fall into the receiving hopper or funnel 20, from which they will slide or fall into the receiving tube 23, and will thence pass through the opening 26, into the packaging device.

Referring now to the packaging device which forms an essential part of my invention, 27 is a tube open on one side, as shown at 28, and also open at both ends, journaled at its upper end in the lower one of the cutter supporting plates 25, and at its lower end in the bottom plate 29. Near its lower end this tube 27 carries a bevel gear 30, with which meshes a bevel gear 31, carried by shaft 32, having an operating handle 33, or other operating means. Projecting radially from the tube 27 at the sides of the opening 28 are wings 34. Within the tube 27 is arranged a tube 35 formed of two parts $35'$ and $35^2$, hinged together, and to the interior of the tube 27 at a point diametrically opposite the opening 28, and carrying wings 36 extending outward between the wings 34. A spring 37 holds the parts $35'$ and $35^2$ pressed toward each other, the space between them being normally slightly less than sufficient space to receive a dime.

In the space between the second plate and the cutter supporting plates are suitably mounted a series of spools of wire 38, preferably six in number, from which wires 39 lead to the opening 26 in the upper cutter supporting plate 24. It is desirable though not essential, that these wires should be led through radially extending inclined holes 40, formed in the plate 24, or through other guiding devices, but if preferred they may lead directly to the opening 26.

$40'$ is a plunger arranged to move vertically in ways secured to the front of the machine in line with the receiving tube 23. This plunger is held normally in raised position by spring 41. Parallel with, and in front of the plunger $40'$, is a rod 42, carrying at its lower end a separating device or wedge 43, adapted to enter between the wings 36 of the inner tube 35, and separate them, so as to permit coins to enter. The rod 42 and wedge 43 are connected to the plunger $40'$ by means of the arm $42'$ and move with said plunger $40'$, and the wedge is so arranged relatively to the plunger that it will reach and spread the wings 36 before the plunger pushes the coins downward out of the tube 23. The rod 42 and plunger $40'$ are operated by means of the finger key indicated at $42''$.

It will be understood that in the operation of the machine, the wires 39 are first united at the center of the opening 26 by twisting their ends together. Then as the coins are pushed from beneath the ends of the coin tubes by the star wheel, and drop into the receiving hopper or funnel, they will slide down to and drop into the receiving tube 23, and will rest on the united ends of the wires. When the desired number of coins has accumulated in the receiver tube, the plunger $40'$ will be depressed, causing, through the action of the wedge 43 on the wings 36, the tube 35 to be opened and at the same time, by the action of the plunger, forces the coins, drawing with them the wire 39, downward into the packaging device. The plunger being released is returned to position by the spring, the wedge 43 being withdrawn from between the wings 36, permitting the inner tube 35 to close on the coins to hold them tightly. The handle 59 is then operated to move the slides 50 and 51, hereinafter described, inward, the curved ends of these slides serving to bring the several wires 39 together, so that they will be in position to be twisted together. The packaging device is then rotated by the operation of the handle 33 causing the wires 39 to be twisted above the pile of coins forming a compact package held together by wires twisted together above and below. When the twisting has been completed the twist is severed between its ends so as to leave the ends of the wires twisted together as at first, ready for a fresh supply of coins. Upon again operating the plunger, the wedge 43, by spreading apart the wings 36, first releases the package completed by the first operation and it drops out or is forced out by the action of the plunger.

While the assembling of the wires preparatory to twisting and the subsequent cutting of the twisted wires may be effected by any convenient means, I prefer to use cutting means arranged between the two plates 24 and 25, comprising slides 50 and 51, on which cutters 52 and 53 are arranged to slide, the slides and cutters being arranged to be operated by cams 54 and 55 carried on shaft 56 which is arranged to be operated in any convenient manner, as by bevel wheel 57 on shaft 58 operated by handle 59. The operating faces of these cams project into recesses 60 formed in the slides 50 and 51, the cutters being correspondingly recessed and consequently moving with the slides. For the purpose of effecting the additional movement of the cutters necessary to sever the wires, the cams are each provided with a projection or additional cam 62, so located that it acts only on the cutters, the slides being suitably cut away to permit the projections to act on the cutters without acting on the slides.

It will, of course, be understood that the wire spools 38 will be so held against rotation as to keep the wires 39 under sufficient tension to cause them to be drawn tightly about the pile of coins.

The coin tubes 9 are preferably formed with openings 64 in their sides to permit the coins in the tube to be seen, and they are also provided with inclined slits 65, through which defective or thin coins discovered through the openings 64 may be removed, by lifting the coins by the fingers or by a suitable instrument, the openings 64 facilitating such operation. The smaller coin tubes, which are adapted for dimes and cents are preferably arranged in a group of five, so that each arm of the star wheel as it passes beneath the tubes of the group will push out five coins. The star wheel has preferably five arms and consequently a complete rotation of the star wheel will push out five coins from each tube making twenty-five coins in all which is the usual number desired for packaging cents.

If it is desired to package dimes in packages of twenty-five, the same arrangement may be used, or if it is desired to make them up in packages of ten, two coin tubes only need be used, or if all are used, the star wheel should be rotated only two fifths of a complete rotation. If, on the other hand, it is desired to put dimes up in packages of fifty, the proper number will be pushed out by two complete rotations. The larger tubes are preferably in a group of four and when this group is in position and all are in use a single rotation of the star wheel will push out twenty coins, making, in case of nickels, a package of one dollar, or in case of quarters, a package of five dollars.

The disks 7 and 8 carrying the coin tubes may be rotated freely on the shaft 6 to bring either group of coin tubes into position and will be held in either position by a spring catch 66, adapted to engage a notch 67 in the periphery of one of the disks. The disks 7 and 8 with their coin tubes are preferably arranged to be capable of a slight vertical adjustment, as by means of adjustable bearings 68 arranged to be raised or lowered by nut 69, so as to allow for coins of different thickness.

In case the number of coins in the coin tubes 9 or any one of them is less than sufficient for a complete package it is desirable that the operation of the machine should be stopped. For this purpose, I provide on the shaft 6, connected therewith so as to rotate with the star wheel, a notched wheel or gear 70, and provide the disk 8 with a series of stopping devices, one for each coin tube for engaging its notches to lock the star wheel against further rotation. This stopping device comprises a rod 71, mounted to slide in a bearing 72, carried by the disk 8, having one end bent downward as shown at 73, in position to engage the teeth of the notched wheel or gear 70, and having its other end provided with a finger or projection adapted to enter a slot 74 in the side of the coin tube, and bear against the coins. A spring 75 tends to press the rod 71 into such position that its end 73 will engage the notched wheel and the spring will act to produce this result if there are no coins in the tube to hold the rod against such movement. A thumb piece 76 is connected to the rod 71 by which it may be pushed back to disengage its end from the teeth of the notched wheel and locked in such position. The thumb piece 76 has a bent end 76′ engaging an annular recess in the rod 71 and the bearing 72 is provided with a notch 72′ into which the end of the thumb piece may be turned to effect the locking.

Each complete rotation of the star wheel is counted by a registering device of ordinary construction, arranged to be operated by the handle 18. It is desirable that each complete package of coin should be provided with a label indicating the amount in the package and such other information as may be desired. Such labels preferably consist of disks of paper or the like and my invention includes devices for automatically feeding into the receiver tube and fastening on top of each pile of coin necessary for a complete package, one of these disks previously properly marked or printed. The devices for this purpose include a holder 77, in which a series of disks 78 are pressed forward by a spring presser 79 against the end 80 of the holder in which is formed a slot 81 and beneath which is an opening 82. Forward of the end 80 is arranged an arm 83 carried by a shaft 84 and arranged when rotated by means of the sprocket chain 95 and suitable sprocket wheels on the shafts 17 and 84, to enter the slot 81 and engage the disk next the end 80 and force it downward through the opening 82 from which it slides through an opening 85 into the receiving hopper or funnel and from that into the receiving tube 23.

For the purpose of indicating to the operator when the star wheel has been rotated through a complete rotation, the handle 18, see Figs. 2 and 5, is provided with a pin 18′ and a pin 18² arranged in the path of the pin 18′ and arranged to be capable of being pushed aside by a continued movement of the handle, the pin 18 being arranged to offer sufficient resistance to the passage of the pin 18² to indicate to the operator that the two pins are in contact.

The receiving tube 23 may, if desired, be carried by a slide mounted to be movable in ways 87 formed in the second plate 22 and the upper plate 24 of the cutter supporting plates. The slide in this arrangement preferably carries two or more receiver tubes 23 of different sizes and preferably also carried a delivery spout 90 so formed that it will deliver coins to one side, so that they will not pass through the packaging device in case it is desired to use the machine for counting coins without packaging them.

The coin tubes instead of being of fixed diameter as shown may be adjustable to fit coins of different sizes as shown in Figs. 18 and 19. In the construction shown in these figures, 92 is the coin tube, consisting of a strip of resilient sheet metal bent into tubular form with its ends overlapping and 93 is a clamp surrounding the tube and holding it against expansion. The screw 94 serves to adjust the size of the clamp and of the tubes inclosed within it.

In the machine here illustrated, I have shown separate operating handles for operating the counting device, the packaging device, the plunger and the cutting device, and for ordinary purposes it is desirable to operate these several devices separately and by hand, but it will, of course, be understood that by the use of simple connecting devices, such as bands or gearing, the several devices may be arranged to be operated by a single power device.

It will be further understood that while, in the construction shown, the packaging device comprises an outer tube and an inner tube, I do not desire to be limited to this precise construction, as it is clear that any clamping means capable of being opened to receive the coins, and of closing upon them to hold them firmly, may be used in place of the tubes.

It will be further understood that while my invention is shown and described as adapted for handling coins, I do not desire to be limited to its use for handling coins alone, as it is evident that it may be readily adapted for counting other articles, such as disks, counters, tablets, pills, etc.

It will be further understood that by rotating the handle by which the star wheel is operated, a proper proportion of a complete rotation, the number of coins fed out may be varied and in this way the device may be used as a money changer.

It will be understood, of course, that many changes in the precise construction, form and arrangement of parts shown may be made, without departing from the spirit of the invention.

Having described my invention, what I claim and desire to secure by Letters Patent, is:

1. The combination of a hopper, a series of vertically arranged coin tubes, an opening in the bottom of said hopper adapted to register simultaneously with two or more of said tubes, said tubes being movable to bring different sets of tubes into register with said opening, and means for feeding coins from the lower ends of the tubes registering with said opening.

2. The combination of a hopper, a plurality of sets of vertically arranged coin tubes, the tubes comprising each set being of equal diameter, an opening in the bottom of said hopper adapted to register simultaneously with the tubes comprising one set, said tubes being movable to bring different sets of tubes into register with said opening, and means for feeding coins from the lower ends of the tubes registering with said opening.

3. The combination of a hopper, a plurality of sets of vertical coin tubes arranged about a center and the tubes comprising each set being of equal diameter, a vertical shaft supporting said tubes, an opening in the bottom of said hopper adapted to register simultaneously with the tubes comprising one set, said tubes being movable about the shaft aforesaid to bring different sets of tubes into register with said opening, and means for feeding coins from the lower ends of the tubes registering with said opening.

4. The combination of a hopper having an arc shaped opening in its bottom, a rotatable disk below the bottom of the hopper having its axis in line with the center of the arc of the opening in the bottom of the hopper, vertically arranged coin tubes carried by the disk arranged in a circle about the center of the disk in such position that they will register with the opening in the bottom of the hopper, when the disk is rotated, means for feeding coins from the bottom of the tubes, and means for locking the disk.

5. The combination of a hopper having an opening in its bottom, a vertically arranged coin tube adapted to register with the opening, a feeding device movable below the bottom of the tube to feed coins therefrom, and means for locking the feeding device against operation, said means being normally held out of operation by contact with the edges of the coins in the coin tube.

6. The combination of a hopper having an opening in its bottom, a vertically arranged coin tube adapted to register with the opening, a rotary feeding device for feeding coins from the bottom of the tube, and means for locking the feeding device against operation comprising an arm extending into the coin tube, a spring tending to press the arm into the coin tube against the coins contained therein and means for locking the arm against movement.

7. The combination of a hopper having an opening in its bottom, a rotary carrier below the hopper provided with a series of coin tubes adapted to register with the opening in the hopper bottom, a feeding device below the carrier for feeding coins from the coin tubes and means for adjusting the carrier vertically to permit coins of different thickness to be fed by the feeding device.

8. In a machine for counting and packaging coins, the combination with coin counting mechanism, of coin packaging mechanism, a holder for labels, and means for feeding a label to the package of counted coins.

9. The combination of a hopper having an arc shaped opening in its bottom, a series of vertically arranged coin tubes below the hopper adapted to be brought in register with the opening, a rod or bar carried by the hopper extending across the upper ends of the series of coin tubes at such distance above the ends of the tubes as to permit coins to pass beneath it into the ends of the tubes only when they are substantially horizontal, and means for feeding coins from the bottoms of the coin tubes.

10. The combination of a hopper having an opening in its bottom, a series of vertically arranged coin tubes adapted to register with the opening, a triangular bar or rod having one of its apices upward, extending across the upper ends of the series of coin tubes and adapted to permit coins to pass into the tubes only when their faces are substantially horizontal, and means for feeding coins from the bottom of the coin tubes.

11. The combination of a plurality of vertically arranged coin tubes, a plate below the bottoms of said tubes, a star wheel having its arms beveled off on their rear edges and arranged that when rotated its arms will pass successively between the lower ends of the coin tubes and the plate to feed coins one by one from the coin tubes, and means for rotating the star wheel.

12. The combination of a plurality of vertically arranged coin tubes, a plate below the bottoms of said tubes, a star wheel having its arms beveled off on the rear edges and so arranged that when rotated its arms will pass successively between the lower ends of the coin tubes and the plate to feed coins one by one from the coin tubes, means for rotating the star wheel, and means for registering the rotation of the star wheel.

13. The combination with means for counting and feeding coins, of means for packaging the counted coins comprising a plate having an opening for the passage of the coins, means for supplying wires to said opening, and means for twisting the wires.

14. The combination with means for counting and feeding coins, of means for packaging the counted coins comprising a plate having an opening for the passage of the coins, guiding means for the passage of wires and means for twisting the wires.

15. The combination with means for counting and feeding coins, of means for packaging the counted coins comprising a plate having an opening for the passage of the coins and having guides for the passage of wires, means for twisting the wires and means for severing the twisted wires.

16. The combination with means for counting and feeding coins, of means for packaging the counted coins comprising a plate having an opening for the passage of the coins and having, about the opening, guides for the passage of wire, a vertically arranged twisting device adapted to receive the coins with the wires about them, and means for rotating the twisting device to twist the wires above the package of coins.

17. The combination with means for counting and feeding coins, of means for packaging the counted coins comprising a plate having an opening and having about the opening guides for the passage of wires, means for conducting the coins to the opening of the stationary plate, means for forcing the coins downward, and a twisting device adapted to receive the coins with the wires about them, and means for rotating the twisting device to twist the wires above the coins.

18. The combination with means for counting and feeding coins, of means for packaging the counted coins comprising a plate having an opening and having about the opening guides for the passage of wires, means for conducting the coins to the opening of the stationary plate, means for forcing the coins downward, and a twisting device adapted to receive the coins with the wires about them, means for rotating the twisting device to twist the wires above the coins, and means for severing the twisted wires.

19. The combination with means for counting and feeding coins, of means for packaging the counted coins comprising a plate having an opening, and having about the opening guides for the passage of wires, means for conducting the counted coins to the opening of the stationary plate, means for forcing the coins downward through the opening of the stationary plate with the wires about them, a twisting device provided with means for adjusting it to receive coins of different sizes, and means for rotating the twisting device to twist the wires above the coins.

20. The combination with means for counting and feeding coins, of means for packaging the counted coins comprising a plate having an opening, and having about the opening guides for the passage of wires, means for conducting the counted coins to the opening of the stationary plate, means for forcing the coins downward through the opening of the stationary plate with the wires about them, a twisting device provided with means for adjusting it to receive coins of different sizes, means for rotating the twisting device to twist the wires above the coins and means for severing the twisted wires.

21. The combination with means for counting and feeding coins, of means for packaging the counted coins, comprising a rotary tube, a clamping device within the rotary tube capable of expansion to receive the coins, and means for rotating the rotary tube, a receiver tube above and in line with the rotary tube, and means for expanding the clamping device and for simultaneously forcing coins from the receiver tube into the inner tube.

22. The combination with means for counting and feeding coins, of means for packaging the counted coins, comprising a rotary tube open on one side, a clamping device within the rotary tube, having wings extending into the opening in the side of the rotary tube, means for holding the clamping device normally in collapsed condition, means for rotating the rotary tube, a receiver tube above and in line with the rotary tube, and means adapted to enter between the wings of the clamping device to expand it and for forcing coins from the receiver tube into the clamping device while it is held in expanded condition.

23. The combination with means for counting and feeding coins, of means for packaging the counted coins, comprising a rotary tube open on one side, an inner tube within the rotary tube having wings extending into the opening in the side of the rotary tube, means for holding the inner tube normally collapsed, means for rotating the rotary tube, a receiving tube above and in line with the rotary tube, a plunger adapted to enter the receiving tube and force the coins therefrom and a wedging device carried by the plunger adapted to enter between the wings of the inner tube and expand the tube in advance of the operation of the plunger on the coins in the receiver tube.

24. In a machine for counting and packaging coins, the combination with coin counting mechanism, of coin packaging mechanism, a holder for labels, and means operated by the coin counting mechanism for feeding a label to the package of counted coins.

25. In a machine for counting and packaging coins the combination with the counting mechanism and the packaging mechanism of a receiver for the counted coins, having an opening in its side, a holder for labels and means operated by the counting mechanism for feeding a label into said opening.

26. In a machine for counting and packaging coins, the combination with the counting mechanism and the packaging mechanism of a receiver for the counted coins having an opening in its side, a holder for labels having a slotted end and means for pressing labels up against said end, of a shaft operated by the counting mechanism provided with an arm adapted to enter the slot in the end of the holder and to force therefrom a single label.

27. In a machine for counting and packaging coins, the combination with the counting mechanism and with packaging mechanism adapted to inclose the counted coins in wires twisted together above and below the pile of coins, of means for feeding in labels so timed with reference to the counting mechanism that the label will be at one end of the pile of coins and will be secured thereon by the wires.

28. In a machine for counting and packaging coins, the combination with means for counting and feeding the coins of a coin tube provided with openings in its sides, of sufficient size to enable the coins in the tube to be grasped by the fingers, and with inclined slits through which defective coins may be removed.

29. In a machine for counting and packaging coins, the combination with means for counting and feeding coins, of a hopper for receiving the counted coins, a slide beneath the hopper, and a plurality of receiver tubes carried by the slide, one of said tubes being curved to discharge the coins out of line with the packaging mechanism.

30. In a machine for counting and packaging coins, the combination with means for counting and feeding the coins of means for twisting wires about a pile of the coins and means for severing the twisted wires comprising a pair of slides and means for forcing them together to grip the twisted wires, cutters carried by and movable on the slides and means for causing the cutters to sever the wires held by the slides.

In testimony whereof I affix my signature, in presence of two witnesses.

JOHN J. FARRELL.

Witnesses:
 ISAAC BACHARACH,
 L. B. FIELD.